United States Patent
Kuang et al.

(10) Patent No.: US 8,737,984 B2
(45) Date of Patent: May 27, 2014

(54) WIMAX INTRA-ASN SERVICE FLOW ID MOBILITY

(75) Inventors: Randy Kuang, Kanata (CA); Wenhui Yuan, Ottawa (CA)

(73) Assignee: Apple Inc., Cupertino, CA (US)

( * ) Notice: Subject to any disclaimer, the term of this patent is extended or adjusted under 35 U.S.C. 154(b) by 936 days.

(21) Appl. No.: 11/717,429

(22) Filed: Mar. 13, 2007

(65) Prior Publication Data

US 2007/0211726 A1    Sep. 13, 2007

Related U.S. Application Data

(60) Provisional application No. 60/781,938, filed on Mar. 13, 2006.

(51) Int. Cl.
  H04W 4/00   (2009.01)
  H04L 12/28  (2006.01)
  H04W 36/00  (2009.01)
  H04W 72/00  (2009.01)

(52) U.S. Cl.
  USPC ........ 455/422.1; 370/331; 370/389; 455/436; 455/445

(58) Field of Classification Search
  USPC ........... 455/422.1, 445, 436, 458, 435.2, 450; 370/395.3, 331, 332, 252, 235, 389, 370/329, 395.1
  See application file for complete search history.

(56) References Cited

U.S. PATENT DOCUMENTS

| | | | |
|---|---|---|---|
| 7,191,179 B2* | 3/2007 | Shaw | 1/1 |
| 7,209,750 B2* | 4/2007 | Barrett et al. | 455/453 |
| 7,317,708 B2* | 1/2008 | Moon et al. | 370/331 |
| 7,339,913 B2* | 3/2008 | Chou et al. | 370/338 |
| 7,561,599 B2* | 7/2009 | Ekl et al. | 370/507 |
| 7,848,297 B2* | 12/2010 | Kyung et al. | 370/335 |
| 7,894,831 B2* | 2/2011 | Ryu et al. | 455/458 |
| 2005/0239465 A1* | 10/2005 | Lee et al. | 455/436 |
| 2005/0265398 A1* | 12/2005 | Chapman et al. | 370/509 |
| 2006/0104225 A1* | 5/2006 | Kim et al. | 370/313 |
| 2006/0160533 A1* | 7/2006 | Chou et al. | 455/422.1 |
| 2007/0140181 A1* | 6/2007 | Channegowda et al. | 370/338 |
| 2007/0195764 A1* | 8/2007 | Liu et al. | 370/389 |
| 2007/0253434 A1* | 11/2007 | Oswal et al. | 370/401 |
| 2008/0076441 A1* | 3/2008 | Zhou | 455/452.2 |
| 2010/0260178 A1* | 10/2010 | Huang et al. | 370/390 |

* cited by examiner

*Primary Examiner* — Nizar Sivji
(74) *Attorney, Agent, or Firm* — Meyertons, Hood, Kivlin, Kowert & Goetzel, P.C.

(57) ABSTRACT

This invention provides a method, system and apparatus for providing service flow identifier ("SFID") mobility in a wireless network, which includes generating a structured service flow identifier, the structured service flow identifier having a service flow identifier field and a service flow granularity field, and establishing a level of service flow identifier mobility for the mobile station based on the structured service flow identifier. The structured service flow identifier can further include a multicast field.

16 Claims, 5 Drawing Sheets

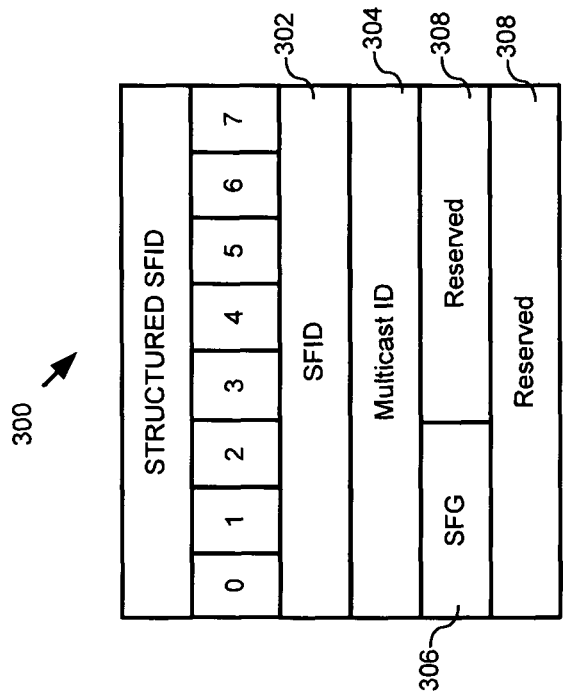

WIMAX INTRA-ASN SERVICE FLOW ID MOBILITY

CROSS-REFERENCE TO RELATED APPLICATION

This application is related to and claims priority to U.S. Provisional Patent Application Ser. No. 60/781,938, filed Mar. 13, 2006, entitled WIMAX SERVICE FLOW ID GLOBAL MOBILITY, the entirety of which is incorporated herein by reference.

STATEMENT REGARDING FEDERALLY SPONSORED RESEARCH OR DEVELOPMENT n/a

FIELD OF THE INVENTION

The present invention relates to communication networks, and more particularly to a method, system and apparatus for controlling service flow mobility across broadband wireless access ("BWA") communication networks.

BACKGROUND OF THE INVENTION

As the demand for high speed broadband networking over wireless communication links increases, so too does the demand for different types of networks that can accommodate high speed wireless networking. For instance, the deployment of Institute of Electrical and Electronics Engineers ("IEEE") 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extended through other technologies such as cellular technology, data throughput using current cellular technologies is limited to a few MB/sec. Put simply, as the distance from the base station increases, the need for higher transmission power increases and the maximum data rate typically decreases. Accordingly, there is a need to support high-speed wireless connectivity beyond a short distance such as within a home or office.

As a result of the demand for longer range wireless networking, the IEEE 802.16 standard was developed. The IEEE 802.16 standards are often referred to as WiMAX or less commonly as WirelessMAN or the Air Interface Standard. These standards provide specifications for fixed broadband wireless metropolitan access networks ("MAN"s) that use a point-to-multipoint architecture (IEEE 802.16d) and combined fixed and mobile broadband wireless access system's (IEEE 802.16e). The WiMAX Forum and its Network Working Group ("NWG") are defining the IEEE 802.16 network architecture and recently issued the NWG Stage-3 draft. Such communications can be implemented, for example, using orthogonal frequency division multiplexing ("OFDM") and orthogonal frequency division multiplexing access ("OFDMA"). OFDM is a multi-carrier transmission technique that has been recognized as an excellent method for high-speed bi-directional wireless data communications. Fundamentally, frequency division multiplexing ("FDM") uses multiple frequencies to simultaneously transmit multiple signals in parallel. While each sub-carrier is separated by a guard band to ensure that they do not overlap in the ordinary FDM, the sub-carriers in the OFDM are squeezed tightly together in order to reduce the required bandwidth. In fact the neighboring sub-channels are overlapped in OFDM. However, the sub-carriers are orthogonal to each other such that there is no inter-carrier interference ("ICI").

The 802.16 standards support high bit rates in both uploading and downloading from a base station up to a distance of about 30 miles (about 50 km) to handle real-time services and bandwidth-intensive applications such as streaming music and video, video surveillance, voice over IP ("VoIP"), video conferencing and other voice and data formats, e.g., time division multiplexing ("TDM"). A typical WiMAX network provides up to 75 megabit per second ("mbps") bandwidth and up to a 50 km range. The 802.16 standard defines a media access control ("MAC") layer that supports multiple physical layer specifications customized for the frequency band of use and their associated regulations. This MAC layer uses protocols to ensure that signals sent from different stations using the same channel do not interfere with each other and "collide".

The 802.16 standards are connection-oriented protocols. Even the management message is based on the preset connection ID ("CID"), which is defined by 802.16 standards as a 16-bit value that identifies a connection to equivalent peers in the MAC of a base station ("BS") and a mobile subscriber station ("MS"). Each connection is assigned a unique CID that maps to a service flow identifier ("SFID"), which is defined by 802.16 standards as a 32-bit value that uniquely identifies a service flow to both a MS and a BS. A SFID defines the quality of service ("QoS") parameter set for a service flow associated with a connection. As such, service flow plays a central role in the technology. Each service flow is associated with zero or one connection depending on the operational mode, e.g., unicast, multicast and broadcast.

Currently, there is a lack of SFID mobility when a mobile subscriber station ("MS") attempts to effect a handover from a serving BS to a target BS, especially during handover between a serving BS communicating with one access service network ("ASN") gateway ("GW") and a target BS communicating with another ASN GW. Each time there is a handover of a MS, the SFID is recalculated and updated to create a new SFID with respect to the new connection that is established. Several attempts to solve this problem have been proposed.

One attempt uses an access service network gateway to assign an ASN GW-wide unique SFID. However, there is no global mobility for this ASN GW-wide unique SFID, nor any multicast service. Another attempt uses a BS assign a BS-wide unique SFID. However, here again, there is no global mobility for this BS-wide unique SFID, and no multicast service within a corresponding ASN GW.

It is therefore desirable to have methods and systems to provide global mobility of a SFID across multiple BSs and ASN GWs that can include additional service flow parameters such as multicast service support and backhaul data path (service flow) granularity.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

This invention provides a method, system and apparatus for controlling service flow identifier mobility on a wireless network, which includes generating a structured service flow identifier, the structured service flow identifier having a service flow identifier field and a service flow granularity field, and establishing a level of service flow identifier mobility for the mobile station based on the structured service flow identifier.

In accordance with one aspect, the present invention provides a method for controlling service flow identifier mobility for a mobile station on a wireless network, the method including generating a structured service flow identifier, the structured service flow identifier having a service flow identifier field and a service flow granularity field, and establishing a level of service flow identifier mobility for the mobile station based on the structured service flow identifier.

In accordance with another aspect, the present invention provides a method for controlling service flow identifier mobility on a wireless network, which includes retrieving a gateway service flow identifier mobility for a mobile station on a wireless network, a memory for storing data corresponding to at least one structured service flow identifier, and a processor, the processor operating to generate a structured service flow identifier, the structured service flow identifier having a service flow identifier field and a service flow granularity field, and to establish a level of service flow identifier mobility for the mobile station based on the structured service flow identifier.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3 is a diagram illustrating a format of a structured service flow ID ("SFID") in accordance with the principles of the present invention;

FIG. 4 is a diagram illustrating an IEEE 802.16 standard 4-Byte SFID;

DETAILED DESCRIPTION OF THE INVENTION

Figure 1:
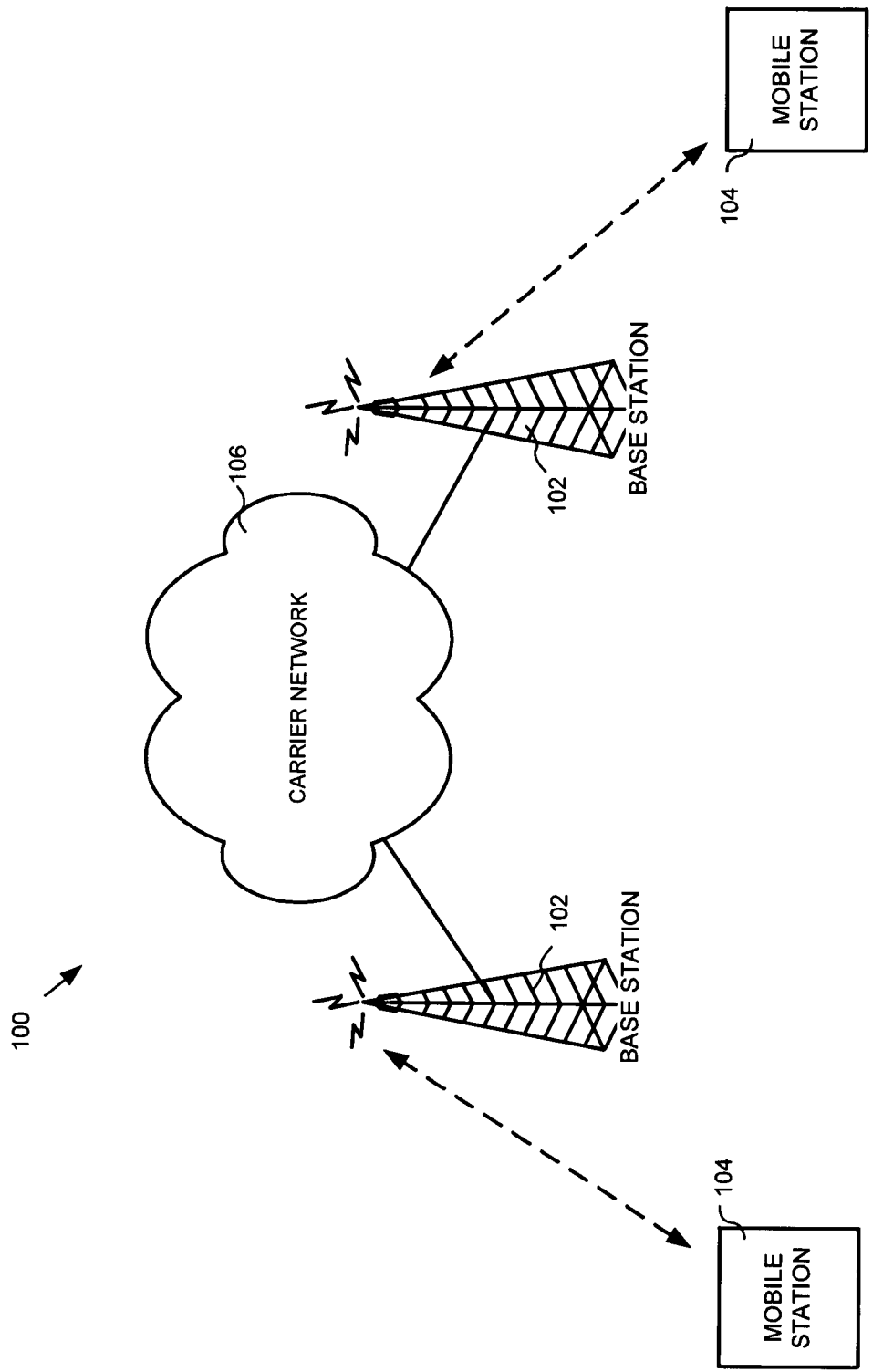
FIG. 1 is a block diagram of the network architecture of a wireless access network constructed in accordance with the principles of the present invention.

Referring now to the drawing figures in which like reference designators refer to like elements, there is shown in FIG. 1, a system constructed in accordance with the principles of the present invention and designated generally as "100." System 100 includes base stations 102 ("BS") and mobile stations 104 ("MS"). Base stations 102 engage in wireless communication with mobile stations 104. Similarly, mobile stations 104 engage in wireless communication with base stations 102.

Base station 102 can be any base station arranged to wirelessly communicate with mobile stations 104. Base stations 102 include the hardware and software used to implement the functions described herein to support SFID mobility. Base stations 102 include a central processing unit, transmitter, receiver, I/O devices and storage such as volatile and non-volatile memory as may be needed to implement the functions described herein.

Mobile stations 104 can be any mobile station including but not limited to a computing device equipped for wireless communication, cell phone, wireless personal digital assistant ("PDA") and the like. Mobile stations 104 also include the hardware and software suitable to support SFID mobility. Such hardware can include a receiver, transmitter, central processing unit, storage in the form of volatile and nonvolatile memory, input/output devices, etc.

Figure 2:
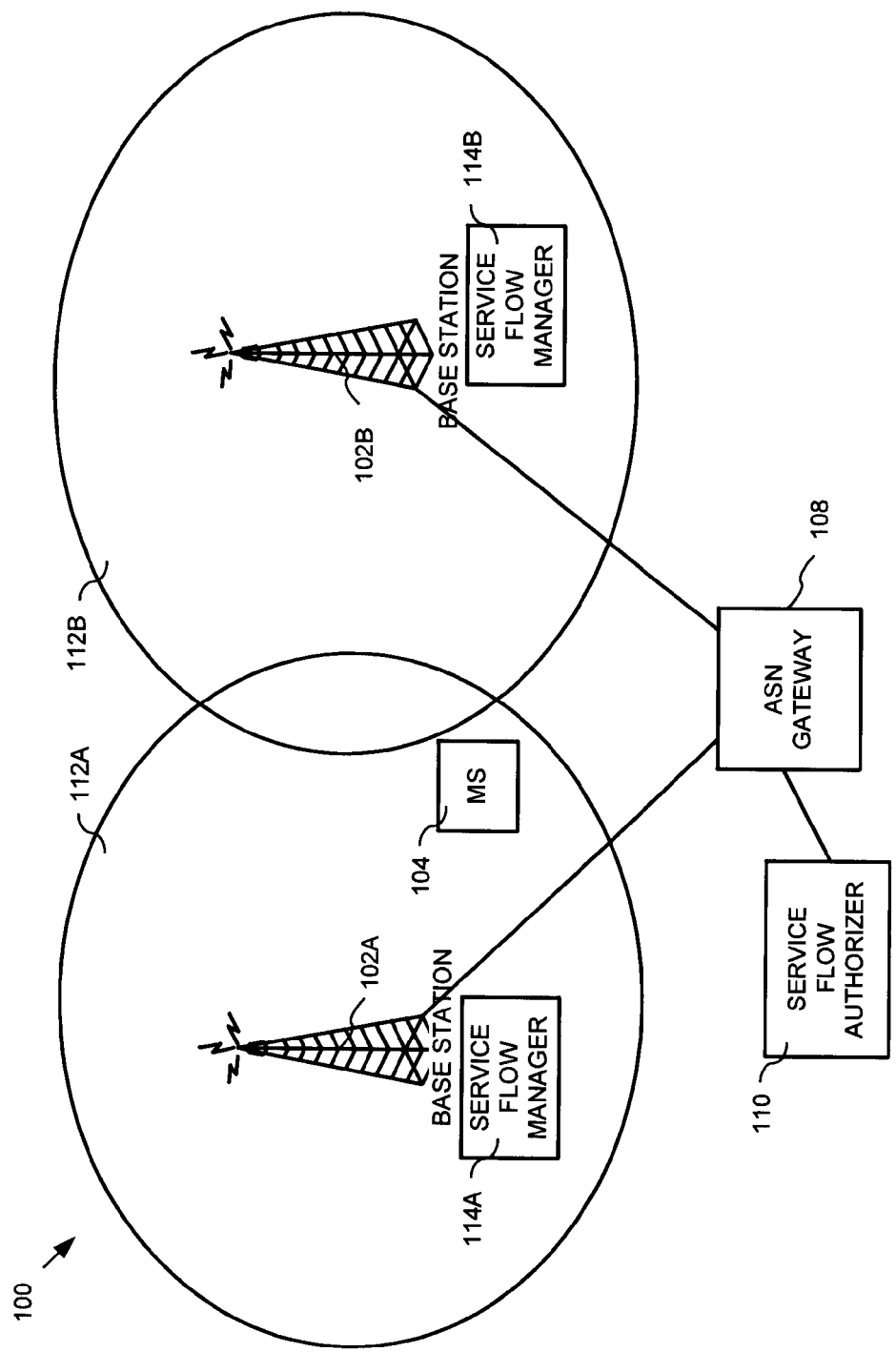
FIG. 2 is a block diagram of a service flow authorizer ("SFA") and a service flow manager ("SFM") within the network architecture of the wireless access network constructed in accordance with the principles of the present invention.

FIG. 2 shows system 100 with an access service network gateway 108 ("ASN GW") in communication with base stations 102A, 102B in accordance with the principles of the invention (base stations 102A and 102B are referred to collectively herein as "base stations 102"). The ASN GW 108 provides an aggregation of control plane functions, e.g., mobility, in addition to performing bearer plane routing or bridging functions. The ASN gateway 108 includes the hardware and software suitable to support the MAC control plane functions used to engage in communication with base stations 102. Such hardware can include protocol translators, impedance matching devices, rate converters, fault isolators, or signal translators as necessary to provide system interoperability. More importantly, the ASN GW 108 provides a number of options for allowing mobility between base stations 102. For example, ASN GW 108 provides a service flow authorizer ("SFA") 110 that generates a structured SFID 300 (FIG. 3) that supports SFID global mobility. Structured SFID 300 is discussed below in more detail with respect to FIG. 3. These options are functionally implemented within ASN GW 108 as described below.

As shown in FIG. 2, mobile station 104 engages in bidirectional communication with base stations 102, which have overlapping coverage regions 22A, 22B respectively. The ASN GW 108 supports interfaces such as the WiMAX network reference architecture R6 interfaces, which implement a set of control and bearer plane protocols for communication between the base stations 102 and the ASN GW 108. The bearer plane includes an intra-ASN data path or inter-ASN tunnel between the base stations 102 and the ASN GW 108. The control plane includes protocols for IP tunnel management (establish, modify and release) in accordance with the mobile station 104 mobility events. The ASN GW 108 to base stations 102 interface may also serve as a conduit for exchange of media access control ("MAC") layer state information between neighboring base stations 102. The ASN GW 108 to mobile station 104 interface may include additional protocols related to the management plane.

In this embodiment, a service flow authorizer module 110 ("SFA") is coupled to the ASN GW 108 and provides the communications network system 100 with the capability to control SFID mobility service by generating a structured SFID for a requested MS 104. As merely an example, the SFA 110 is referred to as a logical/physical function entity, which authorizes and communicates appropriate service flow actions to the ASN GW 108. FIG. 2 also shows service flow manager ("SFM") modules 114A and 114B (collectively referred to herein as "SFMs 114") coupled to BS 102. SFMs 114 provide for the control of service flows by approving or rejecting a request for a service flow. Typically SFMs 114 will activate a service flow in two phases—admit the service flow first, then activate it. For example, the term SFM is broadly defined and refers to a logical/physical entity configured for the creation, admission, activation, modification and deletion of service flows after getting authorization from an SFA 110 component. In addition, SFMs 114 can activate a service flow immediately or defer activation to a later time. Once a service flow has been admitted, both the BS 102 and MS 104 can reserve resources for that service flow. Resources reserved by the BS 102 and MS 104 are not limited to bandwidth, but can include other resources such as memory. Dynamic changes to the QoS parameters of an existing service flow are also approved by the SFMs 114. QoS parameter changes are requested with dynamic service flow messages sent between the BS 102 and MS 104, which are described in more detail with respect to the flow diagram of FIG. 4. The SFA 110 and SFMs 114 can be a software implementation, a hardware implementation or a combination of both.

Some of the functional units described herein have been labeled as modules, in order to more particularly emphasize their implementation independence. For example, a module may be implemented as a hardware circuit comprising custom circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 3 is a diagram illustrating a format of a structured service flow ID ("SFID") 300 in accordance with the principles of the present invention. Structured SFID 300 supports SFID global mobility and includes a 1-byte SFID field 302, a 1-byte multicast group ID field 304, a 3-bit service flow granularity ("SFG") field and a 13-bit reserved field 308. The 1-byte SFID field 302 supports up to 256 service flows per mobile station ("MS") 104. Once a SFID is limited per MS 104, the 1-byte SFID field is sufficient to represent all service flows for that MS 104. This advantageously provides for using the other 3 bytes of the designated IEEE 802.16 standard SFID (FIG. 4) for other identifiers such as the multicast group ID and the SFG. The 1-byte multicast group ID field 304 supports up to 256 multicast group IDs per MS 104. The 1-byte multicast group ID field 304 can be set to zero if the service flow is a unicast service flow. The 3-bit SFG field 306 contains the service flow granularity for the backhaul data paths. In this embodiment, the SFG field 306 defines "000" as the granularity per service flow, "001" as the granularity per subscriber station 104, and "010" as the granularity per base station 102. Reserved field 308 can be used for further expansion of structured SFID 300.

Figure 5:
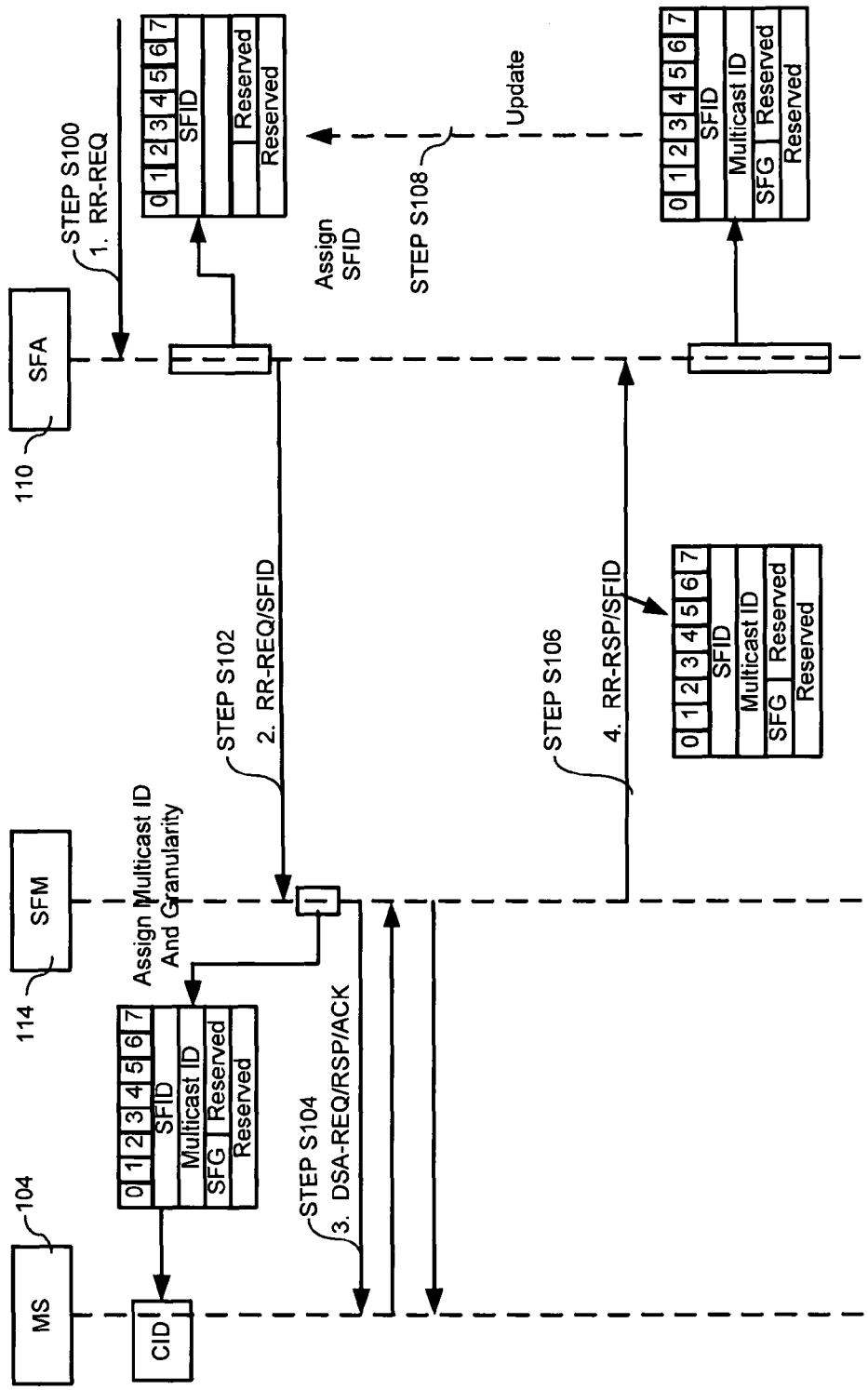
FIG. 5 is a flow diagram illustrating a structured SFID management process for global SFID mobility in accordance with the principles of the present invention.

FIG. 5 illustrates a flow diagram of a structured SFID management process for facilitating SFID mobility in system 100. SFA 110 and SFM 114 are in communication with the each other and MS 104. MS 104 or BS 102 can reserve resources for a service flow by transmitting a resource reservation request message, such as NWG Stage-3 Draft defined RR-REQ to SFA 110 (Step S100). In this embodiment, SFA 110 is part of ASN GW 110 and generates a 1-byte SFID for the requested MS 104. This newly generated SFID field 302 for the MS is delivered to SFM 114 of BS 102 by a resource reservation request message, such as RR-REQ/SFID (Step S102). SFM 114 of BS 102 maps the SFID 300 having SFID field 302 for MS 104 to the local CID 116, which can additionally belong to a multicast group with a multicast ID such as "MID". Multicast ID MID is assigned to the one-byte multicast ID field 304 of structured SFID 300 as SFM 114 updates the multicast ID field 304 of structured SFID 300. In conjunction with the assigning of the multicast ID field 304, the backhaul data path can also be established with configured data path service flow granularity ("SFG") field 306 of SFID 300. In this embodiment, SFG 306 is defined as "000" for granularity per service flow, "001" for granularity per subscriber and "010" for granularity per BS 102.

At step S104, the BS 102 initiates a three-way handshaking process of a dynamic service flow request/response/acknowledge, such as NWG Stage-3 Draft defined DSA-REQ/RSP/ACK, to establish the connection for the service flow with CID 116 (Step S104). During a resource reservation response, such as IEEE 802.16 defined RR-RSP, the newly created 4-byte structured SFID 300 is delivered to SFA 110 (Step S106). SFA 110 can now update the SFID structured data (Step S108). At this point MS 104, BS 102 and SFA 110 of ASN GW 108 each hold a synchronized 4 byte structured SFID 300 that supports global mobility with multicast support.

Figure 6:
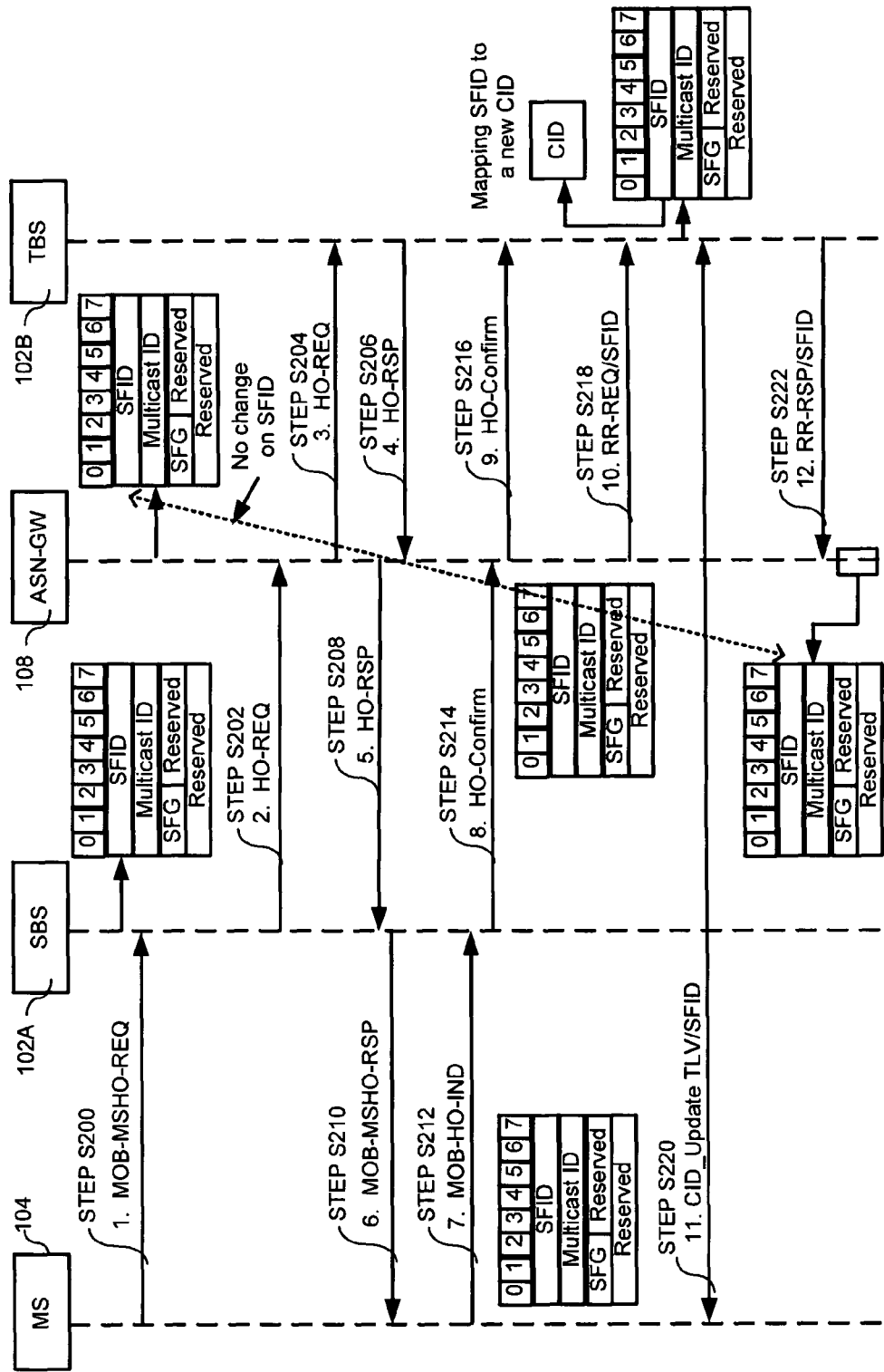
FIG. 6 is a flow diagram illustrating a structured SFID management process for global SFID mobility in accordance with the principles of the present invention.

FIG. 6 is a flow diagram illustrating a structured SFID management process for facilitating SFID mobility in system 100. In this example, it is assumed that MS 104 has an active current service flow with serving BS ("SBS") 102A and has determined that a handover to a target BS ("TBS") 102B is desirable.

MS 104 transmits a mobile station handover request, such as IEEE 802.16 defined MOB-MSHO-REQ, to SBS 102A (Step S200). Upon receiving the mobile station handover request, SBS 102A transmits a handover request, such as IEEE 802.16 defined HO-REQ, to ASN GW 108, which can check the active structured SFID of MS 104. In turn, ASN GW 108 transmits a HO-REQ to TBS 102B (Step S204). Upon receiving the handover request TBS 102B transmits a handover response, such as IEEE 802.16 defined HO-RSP, which can includes the acceptance of the handover request of MS 104 to TBS 102B (Step S206), which handover request is transmitted to SBS 102A via ASN GW 108 (Step S208). At Step S210, SBS 102A transmits a mobile handover response message, such as EE 802.16 defined MOB-MSHO-RSP, to the MS 104 in response to the MOB-MSHO-REQ message (Step S210).

Upon receiving the mobile handover response message from SBS 102A, MS 104 transmits to the SBS 102A a handover indication message, such as IEEE 802.16 defined MOB-HO-IND, which indicates that the MS 104 will be handed-over to the TBS 208 (Step S212), and can release the call with respect to SBS 102A. Before releasing the call, SBS 102A transmits a handover confirmation message, such as IEEE 802.16 defined HO-CONFIRM, to ASN GW 108 (Step S214) which can be relayed to TBS 102B to (Step S216). At Step S218, SFA 110 of ASN GW 108 transmits a resource reservation request message, such as NWG Stage-3 Draft defined RR-REQ to the TBS 102B. In this case, the resource reservation request message includes the structured SFID data of the present invention for MS 104. SFM 114B at TBS 102B remaps the one byte SFID field 302 of SFID 300 to the newly created connection ID 116 for MS 104. As the multicast ID MID 304 and the SFG 306 have been added to structured SFID 300, there is no need to assign a new multicast ID to the service flow. At Step S220, TBS 102B may include CID_Update TLVs in the registration response for MS 104 recognized by TBS 102B as performing handover or network re-entry by the presence of an unexpired SBS identifier in a ranging request message. In this embodiment CID_Update is a compound type-length-value ("TLV") element that provides a shorthand method for renewing active connection used by MS 104 in its previous serving BS 102A. The TLVs specify CID in the TBS 102B that can replace active CID used in the previous serving BS 102A. These TLVs enable TBS 102B to renew connections used in the previous serving BS 102A. At step S222, a resource reservation response, such as NWG Stage-3 Draft defined RR-RSP, carries the structured SFID 300 back to ASN GW 108 and SFA 110 updates the SFID for MS 104. Now MS 104, TBS 102B and ASN GW 108 have the same four byte SFID 300, which retains a multicast ID 304 and a SFG 306.

In an alternative process, the resource reservation request message of Step S218 could be carried within the handover request of Step S204. Additionally, the resource reservation response message with SFID 300 of Step S222 could be carried within the handover response of Step S204. These alternatives would advantageously reduce the quantity of control messages over the R6 interface.

The present invention advantageously provides a method, system and apparatus for providing intra-ASN service flow identifier ("SFID") mobility in a broadband wireless access ("BWA") such as an IEEE 802.16 compliant network. Of course, it is understood that the present invention is not limited to IEEE 802.16 compliant wireless networks and that the invention can be implemented in any wireless network that includes the ability to hand off communications with a wireless device among different base stations.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A method for controlling service flow identifier mobility for a mobile station on a wireless network, the method comprising:
   generating a structured service flow identifier, the structured service flow identifier having:
      a service flow identifier field, and
      a service flow granularity field, the service flow granularity field specifying service flow granularity for at least one backhaul data path, wherein the service flow granularity field has a plurality of different possible values, wherein the plurality of different possible values comprises: a granularity per service flow, a granularity per subscriber station, and a granularity per base station;
   mapping the structured service flow identifier to a connection identifier;
   in response to acceptance of a handover request at a target base station, remappinq the structured service flow identifier to a target base station connection identifier, the target base station connection identifier identifying a connection between the target base station and the mobile station; and
   establishing a level of service flow identifier mobility for the mobile station based on the structured service flow identifier.

2. The method of claim 1, wherein the structured service flow identifier further includes a multicast field.

3. The method of claim 2, further comprising assigning a multicast identifier to the multicast field of the structured service flow identifier.

4. The method of claim 3, wherein the multicast identifier supports service flow identifier mobility across a plurality of base stations and a plurality of access service network gateways.

5. The method of claim 1, further comprising assigning a service flow granularity to the service flow granularity field of the structured service flow identifier.

6. The method of claim 1, further comprising commencing a dynamic service flow process to establish a connection for a service flow.

7. An apparatus for controlling service flow identifier mobility on a wireless network, the apparatus comprising:
   communication circuitry for performing communication; and
   processing hardware coupled to the communication circuitry, wherein the processing hardware is configured to operate with the communication circuitry to:
      generate a structured service flow identifier having at least:
         a service flow identifier field, and a service flow granularity field, the service flow granularity field specifying service flow granularity for at least one backhaul data path, wherein the service flow granularity field has a plurality of different possible values, wherein the plurality of different possible values comprises: a granularity per service flow, a granularity per subscriber station, and a granularity per base station;

map the structured service flow identifier to a connection identifier;

in response to acceptance of a handover request at a target base station, remap the structured service flow identifier to a target base station connection identifier, the target base station connection identifier identifying a connection between the target base station and the mobile station; and establish a level of service flow identifier mobility for the mobile station based on the structured service flow identifier establishing a level of service flow identifier mobility for the mobile station based on the structured service flow identifier.

8. The apparatus of claim 7, wherein a service flow authorizer stores the structured service flow identifier.

9. The apparatus of claim 7, wherein the structured service flow identifier further includes a multicast field.

10. The apparatus of claim 9, wherein the multicast field is assigned a multicast identifier that supports service flow identifier mobility across a plurality of base stations and a plurality of access service network gateways.

11. A non-transitory, computer memory medium storing program instructions for controlling service flow identifier mobility for a mobile station on a wireless network, wherein the program instructions are executable by a processor to:

generate a structured service flow identifier, the structured service flow identifier having a service flow identifier field and a service flow granularity field, the service flow granularity field specifying service flow granularity for at least one backhaul data path, wherein the service flow granularity field has a plurality of different possible values, wherein the plurality of different possible values comprises: a granularity per service flow, a granularity per subscriber station, and a granularity per base station;

map the structured service flow identifier to a connection identifier;

in response to acceptance of a handover request at a target base station, remap the structured service flow identifier to a target base station connection identifier, the target base station connection identifier identifying a connection between the target base station and the mobile station; and establish a level of service flow identifier mobility for the mobile station based on the structured service flow identifier.

12. The non-transitory, computer memory medium of claim 11, wherein the structured service flow identifier further includes a multicast field.

13. The non-transitory, computer memory medium of claim 12, wherein the program instructions are further executable to assign a multicast identifier to the multicast field of the structured service flow identifier.

14. The non-transitory, computer memory medium of claim 13, wherein the multicast identifier supports service flow identifier mobility across a plurality of base stations and a plurality of access service network gateways.

15. The non-transitory, computer memory medium of claim 11, wherein the program instructions are further executable to assign a service flow granularity to the service flow granularity field of the structured service flow identifier.

16. The non-transitory, computer memory medium of claim 11, wherein the program instructions are further executable to commence a dynamic service flow process to establish a connection for a service flow.

* * * * *